United States Patent
Kruger

[15] 3,692,454
[45] Sept. 19, 1972

[54] APPARATUS FOR MAKING HOLLOW PLASTIC ARTICLES

[72] Inventor: Erwin Kruger, Fidazhofen/Wurtt, Germany

[73] Assignee: Ludwig Verpackungen Zach, Schubertstrasse, Germany

[22] Filed: June 9, 1970

[21] Appl. No.: 44,851

[30] Foreign Application Priority Data

March 11, 1970  Great Britain..........11,724/70

[52] U.S. Cl. ..................425/355, 425/388, 425/398, 425/405, 425/457
[51] Int. Cl. ..........................B29c 3/00, B29c 17/03
[58] Field of Search.......18/19 H, 19 P, 19 F, 19 BM, 18/19 R, 35, DIG. 58, DIG. 60, 16 R, DIG. 30

[56] References Cited

UNITED STATES PATENTS

| | | | |
|---|---|---|---|
| 1,668,349 | 5/1928 | Baum | 18/19 P X |
| 2,962,758 | 12/1960 | Politis | 18/19 F |
| 3,259,942 | 7/1966 | Politis | 18/19 F |
| 3,059,810 | 10/1962 | Edwards | 18/19 P X |
| 3,214,797 | 11/1965 | Ollier et al | 18/19 P |

*Primary Examiner*—Robert L. Spicer, Jr.
*Attorney*—Fleit, Gipple & Jacobson

[57] ABSTRACT

Apparatus for heat-shaping plastics articles produces hollow containers having hollow bases. Each article is formed from a plastics sheet which is stretched into a cavity of a matrix or die. The hollow base is then formed by pushing in a lower portion of the sheet in re-entrant fashion. This is done by a punch co-operating in turn with a series of telescopically-slidable sleeves.

11 Claims, 6 Drawing Figures

3,692,454

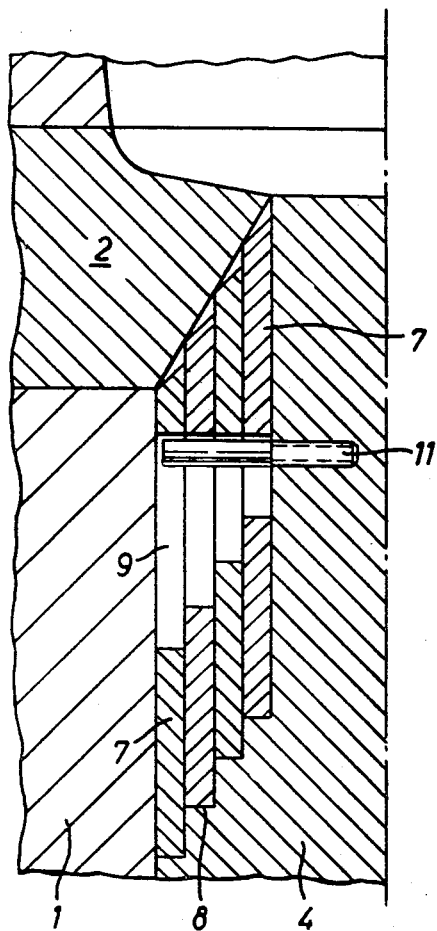
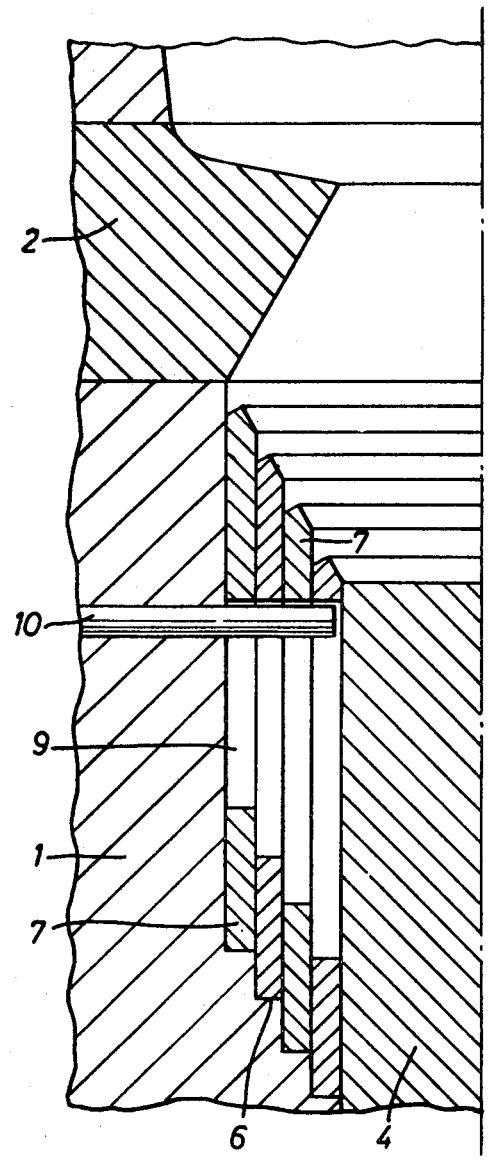

3,692,454

APPARATUS FOR MAKING HOLLOW PLASTIC ARTICLES

FIELD OF THE INVENTION

This invention relates to an apparatus for heat-shaping thermoplastic materials to produce hollow articles with hollow bases. The purpose of the hollow bases is to allow variation of the capacity of the container as required, while maintaining a standard height. This is done by molding the hollow bases to the appropriate height.

BACKGROUND OF THE INVENTION AND DISCUSSION OF PRIOR ART

Machines which heat-shape plastic sheets into appropriate shapes by using a compression or vacuum process have been proposed. These usually consist of a tool member acting as a matrix; mold slides movable therein transversely to the longitudinal axis of the tool member which form the undercut contours between the hollow ends of the hollow article; a plunger for mechanically prestretching each thermoplastic sheet into the cavity of the matrix; and a punch for inverting, i.e., pushing inwardly, the initially outwardly extending base of the hollow article, which lies against the inner wall of the matrix. It has been proposed that machines of this type should operate as follows: with the prestretching plunger raised, the plastic sheet to be deformed is gripped on the upper peripheral edge of the tool member; the plunger is then lowered to mechanically prestretch the previously heated plastic sheet into the cavity of the matrix of the tool member, the plastic material being substantially uniformly distributed; the prestretched plastic sheet is pressed against the inner wall of the matrix by the application of pressure or vacuum; and finally, the base of the plastic article, which is initially pressed outwards, is pressed inwards by the punch, which moves in the opposite direction from the prestretching plunger. The article is thus given a definitive shape.

Although it has been proposed to use transversely movable slide members when making undercut parts of hollow plastic articles or containers by the deep drawing process, such slides have not been used to form undercut profiles between the receptacle and the base of such containers. Prior art designs fail to provide a clearly visible division between the base and the receptacle. This means that the container appears to have a greater volume than it actually has. In order to avoid this situation and to visibly distinguish between the receptacle portion and the base of the container, and also to prevent the receptacle cavity from communicating with cavities in the base of the container, it has been suggested either to make the receptacle and the base from separate parts by a deep drawing process, or to, make the whole container from plastics by injection molding. The first method requires special processing to assemble the two individually made parts, thus necessitating extra manufacturing steps and considerable capital expenditure. The disadvantage of injection molding is that generally only a small manufacturing capacity can be obtained and more material per article is required. For example, plastic mugs which are injection molded may have to be made twice as thick as mugs made by deep drawing.

SUMMARY OF THE INVENTION

The principal object of the invention is to provide an apparatus enabling hollow plastic articles to be made in one piece by deep drawing.

A further object of the invention is to provide an apparatus for making hollow plastics articles of high utility and attractiveness without the high consumption of material usually associated with injection molding.

Another object of the invention is to provide apparatus for economically producing hollow containers of enhanced appearance.

According to the invention we provide an apparatus for heat-shaping thermoplastic materials, including a tool member forming a matrix for a hollow article, the article having an open and a closed end; shaping means for operating on the article transversely to the axis of the matrix; and deforming means for urging the material of the closed end of the article inwardly to form a base, said deforming means comprising a plurality of telescopically slidable sleeves and a punch of stepped configuration of which the steps act, in use, on the sleeve in turn.

PREFERRED AND ADVANTAGEOUS FEATURES OF THE INVENTION

Preferably, the sleeves and the shaping means are profiled to form base walls of the article of substantially uniform thickness.

Advantageously, the punch has restoring pins extending therefrom which are disposed to positively return the sleeves on the return stroke of the punch.

In a preferred embodiment, the sleeves are alternately hard and soft metal.

The apparatus may include means for prestretching a sheet of thermoplastic material into the cavity of the matrix preparatory to forming the article.

Also, the apparatus may include vacuum or compression means for pressing the article against the wall of the matrix cavity.

In one particularly advantageous form of apparatus according to the invention the tool member has a plurality of segments, preferably three in number. These segments form a support for sleeves at the bottom of a cavity which receives a punch. The segments are uniformly distributed around the periphery of the cavity, descend inwardly and are concave or stepped. The sleeves are equal in number to the steps and are arranged concentrically and axially displaceably between the punch and the tool member. The punch has stops for lifting the sleeves off the supporting segments of the tool member on the upward movement of the punch, and these steps are in three sections alternated peripherally with the supporting segments of the tool member. The punch segments ascend inwardly, and are suitably convex or stepped with the same member of gradations as sleeves. When the sleeves are lifted off the supporting segments of the tool member on the upward movement of the punch, they begin to shape the peripheral slanting edge portions of the previously outwardly extending base of the article.

In this construction the individual coaxial annular sleeves rest on the inwardly descending stepped supporting segments of the tool member when the punch is at rest. The top surfaces of the sleeves thus form an inwardly descending surface, or parts of one, to which the plastic sheet, which has first been mechanically prestretched and then expanded by pressure or vacuum is applied. This provides an initially outwardly extending base for the container. When the punch moves upwards against the pressure of the molding air or vacuum in the next stage of the process, its inwardly ascending stepped lifting segments engage the coaxial sleeves. The top surfaces of the sleeves now form an inwardly ascending slope in the central part of the punch. The inwardly ascending end surfaces of the sleeves and the punch together engage the base of the hollow article (which was previously pressed out) and press it far enough into the article to bring the edge sections of the inverted base into intimate contact with the already shaped wall of the base of the container. The central section of the base, which is engaged by the actual punch, provides a tight seal at its periphery with the adjacent boundary between the receptacle and the base of the container and thus forms the base of the receptacle itself. The process is assisted if the central piston of the punch is given an offset, individually selected for each case, and if the top edge thereof matches the profile of the shaping means or slide. This may substantially eliminate many of the defects from which such articles have suffered in the past. It may, for example, eliminate troublesome air-gaps between the receptacle and the cavities which are sometimes left in the base. It also allows articles in which the receptacle is integral with the base to be made so that the peripheral wall of the base can assume a large number of angular positions relative to the axis of the container and almost any desired shape. A bent wall at the base of the container may give the base greater strength than it would normally have had. Thus the apparatus proposed can produce hollow articles by the deep drawing process, with many of the advantages of a deep drawing process and with very few of its drawbacks. The articles made actually consist of one piece, although they many appear to consist of two.

Particularly high speeds can be obtained by the sleeves in the apparatus according to the invention. In order to prevent the sleeves from jamming and causing possible damage to the machine, a preferred embodiment of the invention envisages that the sleeves should contain axial slots which are engaged by guide pins connected to the tool member for limiting the upward stroke of the sleeves, and by restoring pins connected to the punch for positively returning the sleeves on the return stroke of the punch.

An example of a preferred embodiment of the present invention is illustrated diagrammatically in the accompanying drawings, in which:

Brief Description of the Drawings:

FIGS. 5 and 6 are longitudinal sections through part of the apparatus showing the guide pins engaging in the longitudinal slots in the sleeves, when the punch is respectively raised and lowered.

DESCRIPTION OF THE ILLUSTRATED EMBODIMENT OF THE INVENTION

The drawings show a tool member 1 which acts as a matrix and two mold slides 2 which move in the direction of the arrows shown on the slide, i.e., transversely to the longitudinal axis of the tool member. The slides 2 form undercut contours between the cone and the opposed cone of a hollow article to be molded. A thermoplastic sheet is fixed on the top edge of the tool member 1. During the first phase of the shaping operation a prestretching plunger, preferably covered with felt, presses the sheet to be deformed into the matrix cavity 3 of the tool member 1 and mechanically prestretches it. The article is then applied by pressure or vacuum to the inner wall of the matrix. A punch 4 is operated in the second phase and is axially movable in the direction of the arrow shown on the punch. The function of the punch is to press inwards the base of the hollow article, thereby forming the tapered article.

Figure 1:
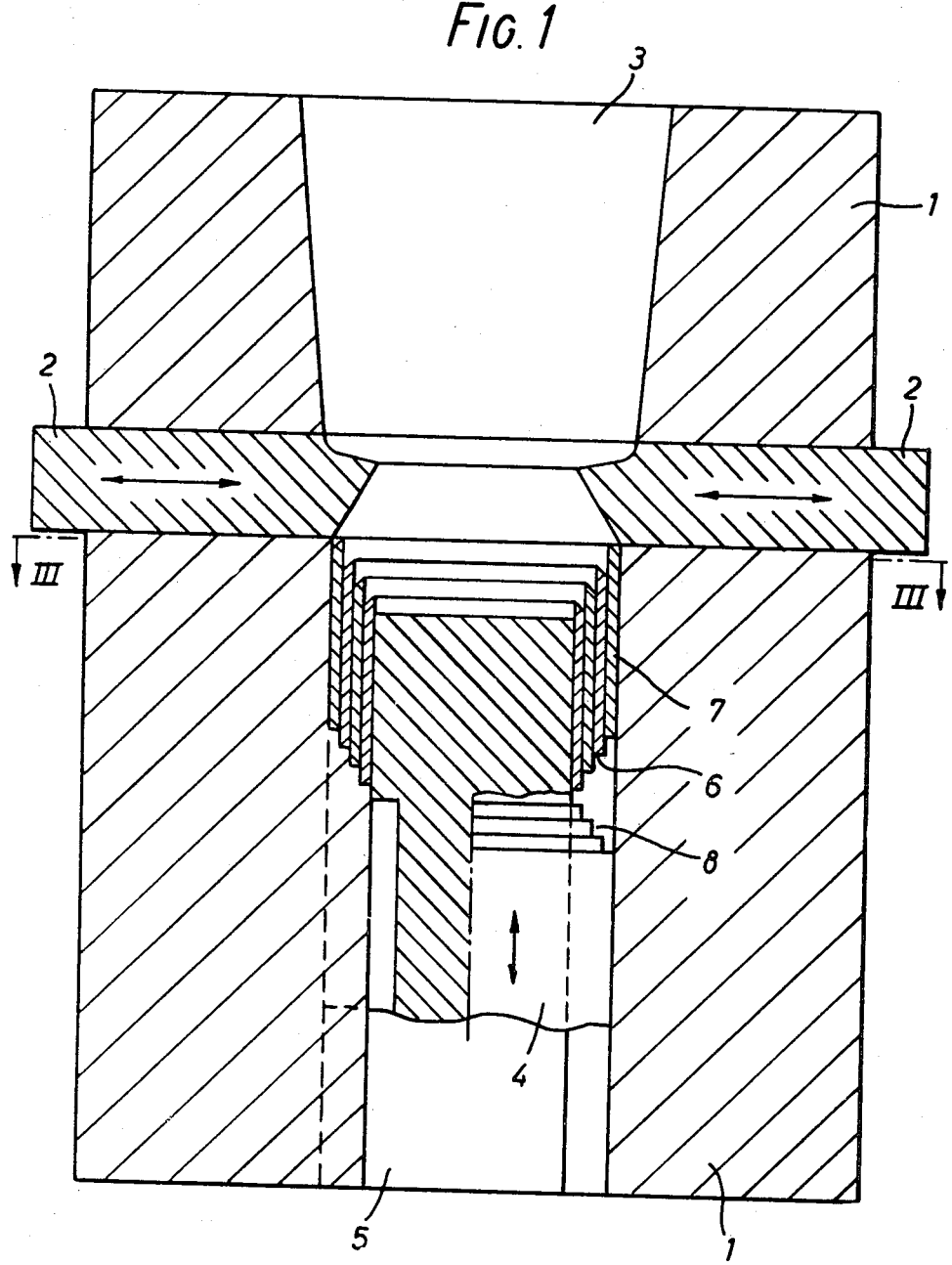
FIG. 1 is an axial longitudinal section through the apparatus on the line III—III in FIG. 3, with the punch lowered in the first phase of the operation.
Figure 2:
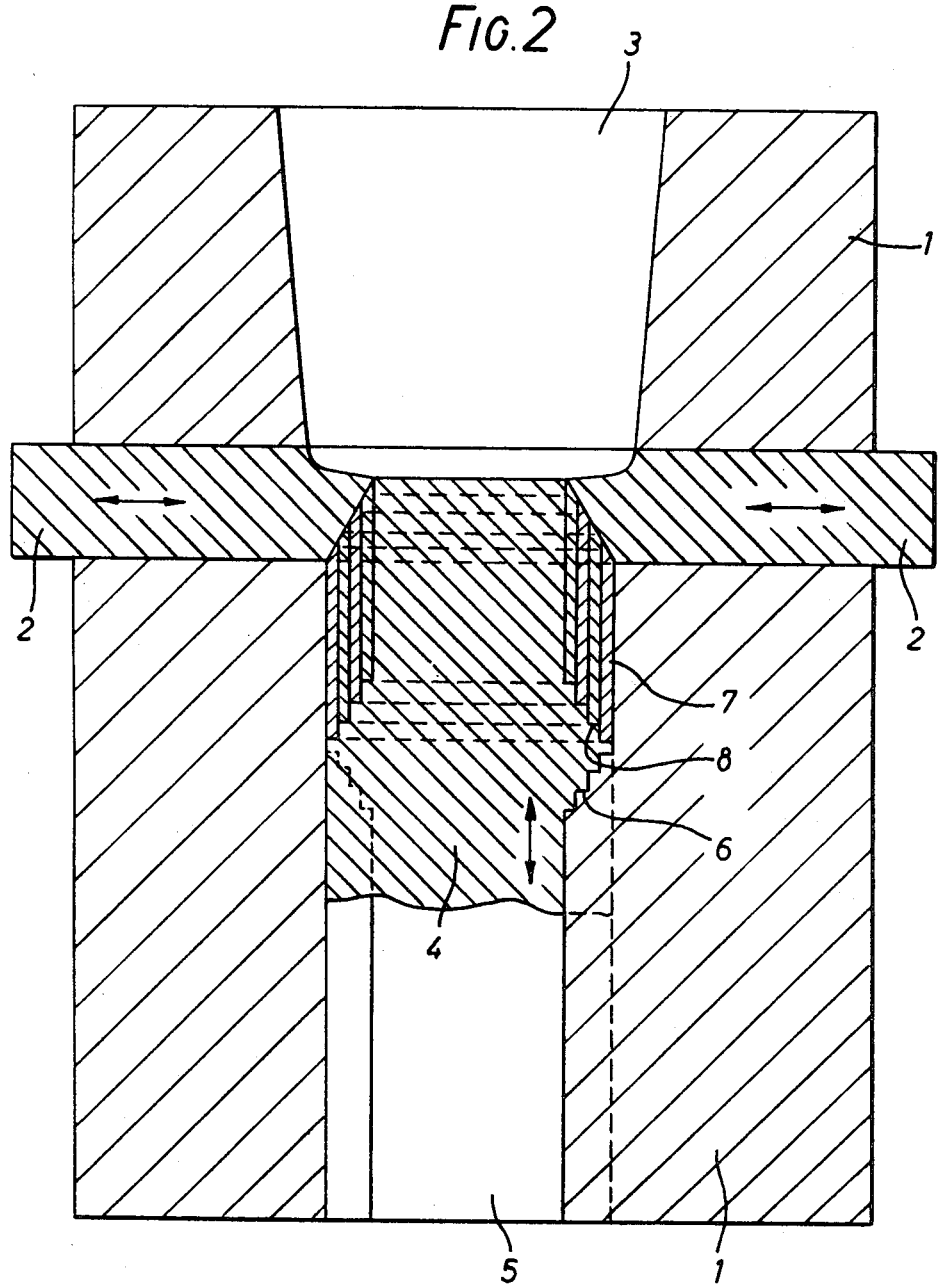
FIG. 2 is a longitudinal section through the same apparatus with the punch raised to press in the base of the container.

Stepped segments 6 for sleeves 7 are provided at the bottom of a cavity 5 in the tool member 1. The cavity 5 forms a guide for the punch 4. The segments 6 descend inwardly in steps and are evenly divided at the periphery of the cavity. The sleeves 7 are equal in number to the steps and are longitudinally displaceable in an axial direction. In the present example there are four steps and consequently four annular sleeves. Different material is chosen for alternate sleeves so that hard material alternates with soft, for example steel with brass, in order to prevent the relatively moving sleeves 7 from wearing one another out during the lifting movement of the punch 4. The punch 4 has segments 8 alternately spaced between the stepped segments 6 of the tool member 1. The segments 8 have four steps ascending inwardly. On actuation of the punch 4 the segments 8 drive the sleeves 7, which are lifted off their seats on the stepped segments 6 of the member 1. In the position shown in FIG. 2 the top surfaces of the sleeves press the peripheral slanting edge regions of the base of the hollow article (which was previously pressed out) inwards to form the tapered base of the article.

Figure 3:
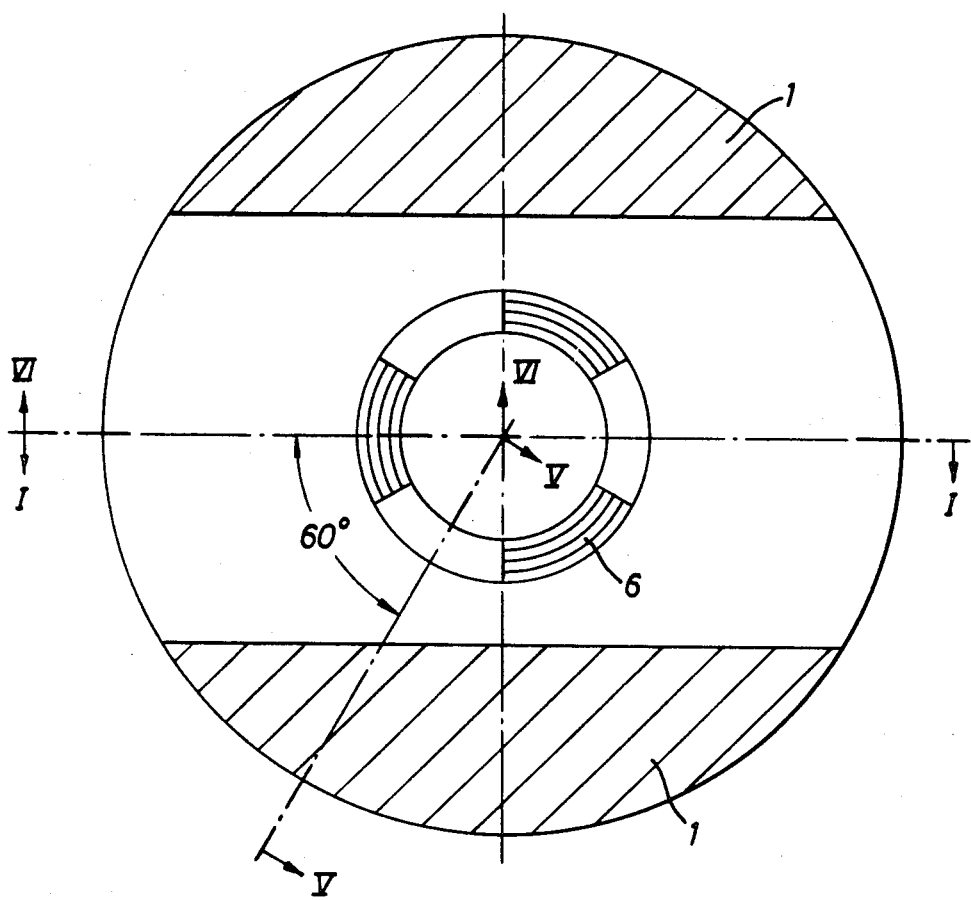
FIG. 3 is a cross-section through the working part of the FIG. 1 apparatus on the line III—III, i.e., following the removal of the punch and sleeves.
Figure 4:
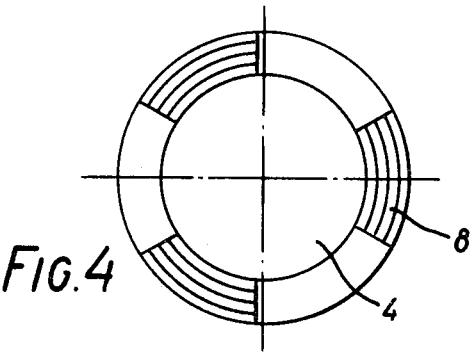
FIG. 4 is a cross-section through the working part of the FIG. 1 apparatus similar to FIG. 3 showing the punch.

The longitudinally displaceable sleeves 7 have axially parallel slots 9 which are engaged by guide pins 10 and 11. FIG. 6 shows how the pins 10 are connected to the member 1 and limit the upward stroke of the sleeves 7. As shown in FIG. 5, the other pins 11 are carried by the punch 4 and positively return the sleeves 7 to the steps 6 on the return stroke of the punch 4. The three stepped segments on the member 1 and the three stepped segments on the punch 4 are equally angularly spaced. This is most clearly apparent in FIGS. 3 and 4.

In the position shown in FIG. 6 the base of the hollow article to be molded is still pressed outwards in a semi-molded state, i.e., is pressed downwards by pressure or vacuum, whereas in the position shown in FIG. 5 it is pressed by the top ends of the sleeves 7 against the oblique inner surface of the two mold slides 2.

Articles made by the apparatus hereinbefore particularly described will generally have several advantageous features which are uncommon to other articles of the same type. For example, the base of each article will usually be externally recognizable, thus giving a realistic impression of the container capacity. Furthermore, each article will normally be free of air gaps in the base of the receptacle or leading towards cavities in the base of the container. This is particularly advantageous when liquids are likely to separate from the material to be held in the container, such as whey from yogurt.

It will be appreciated that modifications can be made, within the principle of the invention, to the apparatus particularly described herein, and thus the terms there used are employed by way of description and not limitation. The monopoly claimed is to be determined within the spirit and scope of the following claims.

What is claimed is:

1. An apparatus for heat-shaping thermoplastic materials, including a tool member forming a matrix for a hollow article, the article having an open and a closed end; shaping means for operating on the article transversely to the axis of the matrix; and deforming means for urging the material of the closed end of the article inwardly to form a base, said deforming means comprising a plurality of telescopically slidable sleeves and a punch of stepped configuration of which the steps act, in use, on the sleeves in turn.

2. Apparatus according to claim 1, in which the sleeves and the shaping means are profiled to form base walls of the article of substantially uniform thickness.

3. Apparatus according to claim 1, in which the sleeves have slots to co-operate with guide pins in the tool member to prevent rotation of the sleeves.

4. Apparatus according to claim 3, in which the pins and slots are located to limit the axial movement of the sleeves.

5. Apparatus according to claim 1, in which the punch has restoring pins extending therefrom and disposed to positively return the sleeves on the return stroke of the punch.

6. Apparatus according to claim 5, wherein three sleeves are used.

7. Apparatus according to claim 6 in which the sleeves are alternately hard and soft metal.

8. Apparatus according to claim 1 including means for prestretching a sheet of thermoplastic material into the cavity of the matrix preparatory to forming the article.

9. Apparatus according to claim 8 in which the means for prestretching is in the form of a plunger.

10. Apparatus according to claim 1 in which the steps of the punch are formed in segments which are alternated with stepped segments of the tool member and in which the segments of the tool member form a support for the sleeves when the sleeves are not being supported by the steps of the punch.

11. Apparatus according to claim 10 in which there are three stepped segments on the punch and three stepped segments on the tool member, the segments being equally angularly spaced.

* * * * *

UNITED STATES PATENT OFFICE
CERTIFICATE OF CORRECTION

Patent No. 3,692,454        Dated September 19, 1972

Inventor(s) Erwin KRUGER

It is certified that error appears in the above-identified patent and that said Letters Patent are hereby corrected as shown below:

On the title page, change the assignee name "Ludwig Verpackungen Zach" to -- Ludwig Zach Verpackungen --

Signed and sealed this 17th day of April 1973.

(SEAL)
Attest:

EDWARD M. FLETCHER, JR.        ROBERT GOTTSCHALK
Attesting Officer              Commissioner of Patents